US008480403B2

(12) United States Patent
Jarrell et al.

(10) Patent No.: US 8,480,403 B2
(45) Date of Patent: Jul. 9, 2013

(54) TECHNIQUES FOR DELIVERING MEDICAL CARE BY IMPROVING DECISION-MAKING SKILLS OF MEDICAL PERSONNEL

(75) Inventors: Bruce Jarrell, Severna Park, MD (US); John Raczek, Baltimore, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 1766 days.

(21) Appl. No.: 11/045,657

(22) Filed: Jan. 28, 2005

(65) Prior Publication Data
US 2005/0170323 A1  Aug. 4, 2005

Related U.S. Application Data

(60) Provisional application No. 60/540,768, filed on Feb. 2, 2004, provisional application No. 60/589,381, filed on Jul. 20, 2004.

(51) Int. Cl.
G09B 23/28 (2006.01)

(52) U.S. Cl.
USPC .......................................... 434/262; 434/267

(58) Field of Classification Search
USPC .......................................... 434/262, 267, 272
See application file for complete search history.

(56) References Cited

U.S. PATENT DOCUMENTS

| | | | | |
|---|---|---|---|---|
| 5,385,474 A | * | 1/1995 | Brindle | 434/267 |
| 5,769,640 A | * | 6/1998 | Jacobus et al. | 434/262 |
| 5,956,040 A | * | 9/1999 | Asano et al. | 345/419 |
| 6,074,213 A | * | 6/2000 | Hon | 434/262 |
| 6,126,450 A | * | 10/2000 | Mukai et al. | 434/262 |
| 6,692,258 B1 | * | 2/2004 | Kurzweil et al. | 434/262 |
| 6,739,877 B2 | * | 5/2004 | Bailey et al. | 434/262 |
| 6,747,672 B1 | * | 6/2004 | Haakonsen et al. | 715/700 |
| 6,991,464 B2 | * | 1/2006 | Liebert | 434/236 |
| 2002/0127525 A1 | * | 9/2002 | Arington et al. | 434/262 |
| 2004/0191744 A1 | * | 9/2004 | Guirguis | 434/322 |

OTHER PUBLICATIONS

J.A. Gordon, et al., Bringing good teaching cases "to life": a simulator-based medical education service, Academic Medicine, Jan. 2004, pp. 23-27, vol. 79, No. 1.
N.F. Noy, et al., Pushing the envelope: challenges in a frame-based representation of human anatomy, Data and Knowledge Engineering, 2004, pp. 335-339, vol. 48.
Susan M. Williams, Putting case-based instruction into context: Examples from legal and medical education, The Journal of the Learning Sciences, 1992, pp. 367-347, vol. 2, No. 4, Publisher: Lawrence Eribaum Associates, Inc., Published in: US.

* cited by examiner

Primary Examiner — Xuan Thai
Assistant Examiner — Peter Egloff
(74) Attorney, Agent, or Firm — Evans & Molinelli PLLC; Eugene J. Molinelli

(57) ABSTRACT

Techniques for delivering medical care by improving decision making skills of medical personnel who deliver the care include receiving normal data that indicates normal conditions in a patient. Abnormality data is received from an author and indicates an abnormal condition in a patient. An instance of a virtual patient is generated based on the normal data and the abnormality data. The instance describes a sufficiently comprehensive physical state of a patient having the abnormal condition to simulate clinical measurements of the patient's condition. Action data is received from a trainee who is different from the author. Action data indicates a requested action relevant to dealing with the instance. Response data is generated based on the action data and the instance. Display data is presented to the trainee based on the response data. The display data indicates information about the instance available as a result of the requested action.

20 Claims, 5 Drawing Sheets

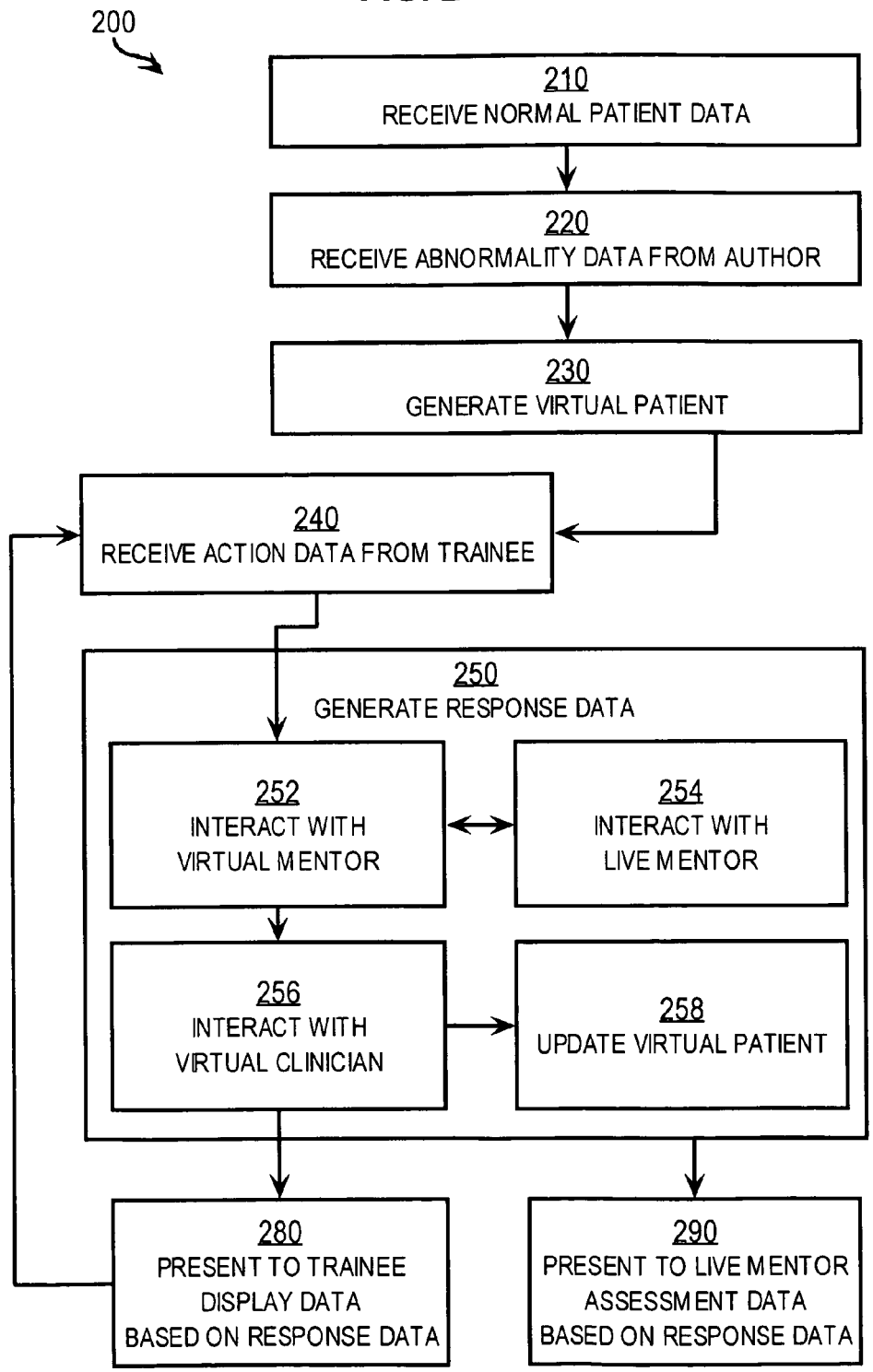

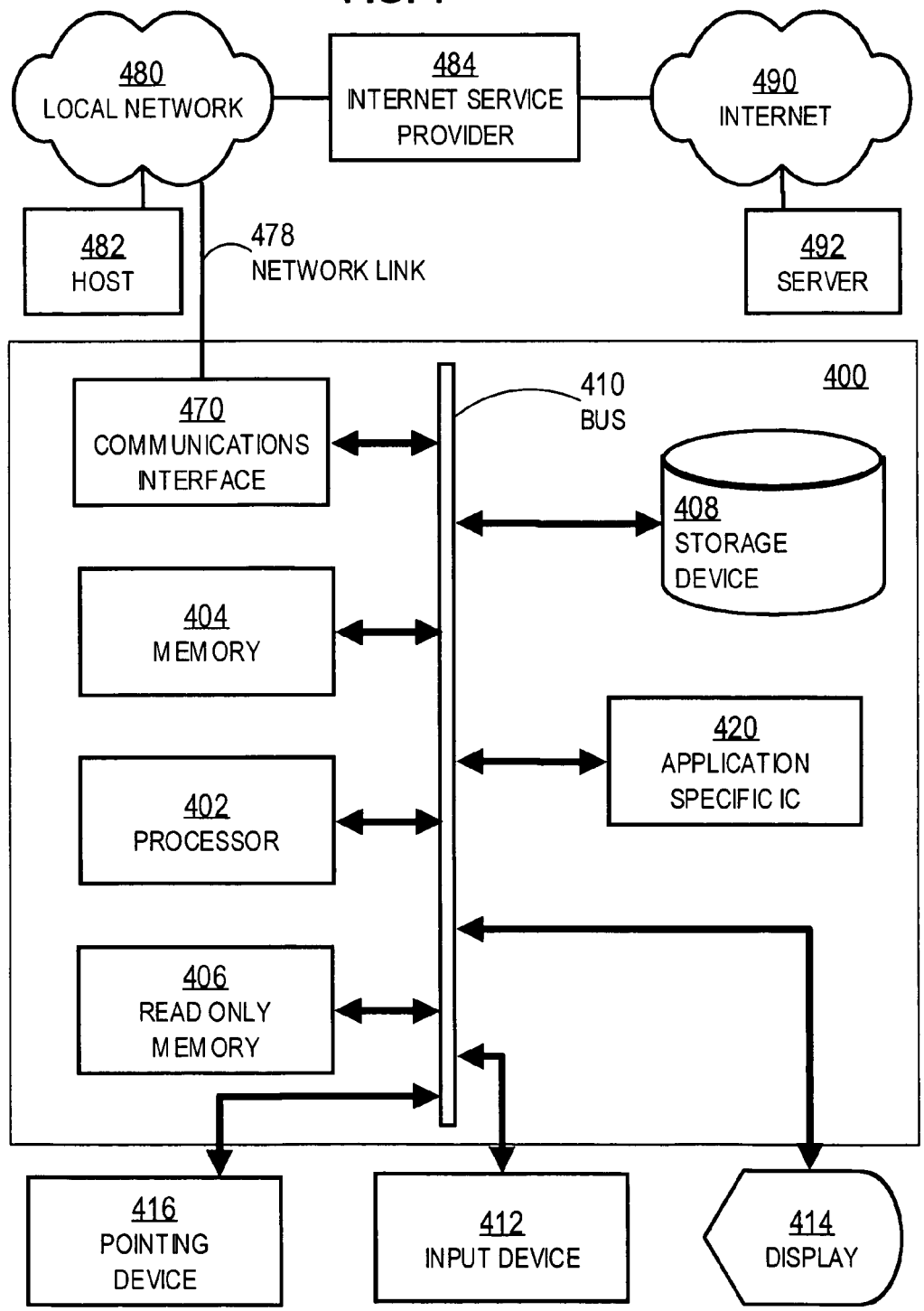

TECHNIQUES FOR DELIVERING MEDICAL CARE BY IMPROVING DECISION-MAKING SKILLS OF MEDICAL PERSONNEL

CROSS-REFERENCE TO RELATED APPLICATIONS

This application claims benefit of Provisional Appln. 60/540,768, filed Feb. 2, 2004, under 35 U.S.C. §119(e).

This application also claims benefit of Provisional Appln. 60/589,381, filed Jul. 20, 2004, under 35 U.S.C. §119(e).

BACKGROUND OF THE INVENTION

1. Field of the Invention

The present invention relates to medical care delivery, and in particular to improving medical care delivery by improving decision-making skills of medical personnel with systems that simulate interactions with a mentor or a patient using a virtual patient or virtual mentor or both.

2. Description of the Related Art

Medical care delivery is major industry in the United States. An important component of medical care delivery is a cadre of trained medical care professionals who can diagnose patient condition and prescribe treatment protocols using cognitive skills. The fewer errors made by this cadre, the better is the medical care delivered. Currently, cognitive skills of medical care professionals are developed by close interaction with other members of the profession who are already highly skilled and serve as mentors. Of those already skilled only some are good mentors. The more people trained by the good mentors, the better the medical care delivered.

Individuals who are both good physicians and good mentors have limited time, energy and patience to effectively train all medical care profession students and professionals undergoing continuing medical education, collectively called herein medical trainees. To compound the problem, trainees have a limited time to train. Both mentors and trainees would greatly benefit from an automated system that takes on some or most of this burden.

Recently, medical trainees have had their workweek limited to 80 hours. Under this constraint, they must safely complete their required patient care duties while still fulfilling the requirements of a rigorous educational program. In addition, the content of this educational program must evolve continuously by being updated and re-prioritized given the remarkable progress in areas such as the human genome project and molecular biology. Physicians are expected to remain broadly knowledgeable and specifically expert, yet there are no good automated methods to support accomplishing these expectations. Currently, physicians learn information through reading, conferences, one-on-one discussions with experts who are effective mentors, and trial-and-error management of real patients. Safer and more efficient methods for becoming expert and reducing error rates prior to patient contact are desirable.

A number of expert systems have been developed to capture the expertise of medical professionals. Some of these expert systems have been used in the training of students preparing for the medical profession. Training strategies emanate from the work of Ericsson, K. A. (Ed.) (1996). *The Road to Excellence: The Acquisition of Expert Performance in the Arts and Sciences, Sports and Games*. Mahwah, N.J., Lawrence: Lawrence Erlbaum Associates. These strategies indicate that the acquisition of expertise in skills and cognitive knowledge is, among other factors, strongly related to deliberate sessions to rehearse well-defined tasks and to obtain immediate feedback designed around ways to improve performance. These strategies have been applied to technical skills training in medicine through the simulation of manual procedures, such as insertion of a chest tube, in part-task trainers. Progress in this area has been slow due to the complex nature of the simulation. Application of these strategies to cognitive skills has been even more difficult, as evidenced by the extensive work done and few resultant successes for expert systems, intelligent tutors and similar systems.

While prior approaches serve as suitable aids for some procedures and isolated organ systems, these expert systems suffer some deficiencies. For example, accepted practice dictates one or a few certain sequences of steps to isolate and treat a problem, and expert systems capture this standard practice. Existing training systems, to varying degrees, capture one or more standard practices and reward a trainee who follows them. Little feedback is provided to a student who deviates from accepted practice, other than to stop the process and report a failure.

However, patient care is a complex problem and procedures change as new understanding and new technology become available. Therefore teaching medical trainees to follow accepted practice by rote is not good training for understanding how the standard practice evolved and is likely to evolve into the future. Furthermore, a patient with multiple conditions may involve different practices that may be confusing to implement together, or, even worse, incompatible for combination. For understanding sufficient to function at such levels, it is preferable to teach trainees to address patient care as discovering the most effective treatment for a complex problem using a variety of knowledge sources, information gathering procedures, incremental logic, treatments and interventions—a cognitive process used by the most successful practitioners and successfully taught by the more successful mentors. In some cases, a successful mentor stops the trainee who is deviating too far, in some cases a successful mentor suggests alternatives to consider, and in some rare cases that do not endanger a patient, the mentor may let the trainee arrive at the accepted response through a circuitous route of self discovery.

Based on the foregoing, and other aspects of the problem described in more detail below, there is a clear need for automated systems that take on some or most of the burden of conveying cognitive skills to medical trainees.

SUMMARY OF THE INVENTION

Techniques are provided for delivering medical care by decision-making skills to medical personnel who deliver the care.

In a first set of embodiments, a method includes receiving normal data and abnormality data from an author. Normal data indicates normal conditions in a patient. Abnormality data indicates an abnormal condition in a patient. An instance of a virtual patient is generated based on the normal data and the abnormality data. The instance of the virtual patient describes a sufficiently comprehensive physical state of a patient having the abnormal condition to simulate clinical measurements of the patient's condition. Action data is received from a trainee who is different from the author. Action data indicates a requested action relevant to dealing with the instance of the virtual patient. Response data is generated based on the action data and the instance of the virtual patient. Display data based on the response data is presented to the trainee. The display data indicates information about the instance of the virtual patient available to a medical professional as a result of the requested action.

In some embodiments of the first set, the step of generating response data includes mentor response data that indicates expert advice from a mentor based on the action data and the instance of the virtual patient and a model of a virtual mentor. The display data includes the mentor response data.

In some of these embodiments, the mentor response data is based on a knowledge base rule and a pedagogical rule. In some of these embodiments, the pedagogical rule is one or more of a null response rule, a guided response rule, and an intervention rule. The null response rule provides an empty mentor response, whereby the trainee is taught through self-discovery. The guided response rule directs the trainee to consider a deficiency in the requested action, or an alternative action, or a topic in a knowledge base, or multiple search elements to use in a search engine, or some combination. The intervention rule modifies or prevents the requested action.

In some of these embodiments, the step of receiving action data from the trainee includes receiving data that indicates asking a question of the virtual patient, requesting file data about the virtual patient, requesting a diagnostic test for the virtual patient; requesting an imaging procedure for the virtual patient; requesting a surgical procedure on the virtual patient; and prescribing a treatment for the virtual patient.

In some embodiments of the first set, the step of generating response data includes updating the instance of the virtual patient. In some of these embodiments, updating the virtual patient includes one or more of determining a physical state of a patient having the abnormality after an advancement in time; or determining the physical state of the patient after the advancement in time with a treatment indicated in the action data; and determining the physical state of the patient after a surgical procedure indicated in the action data is performed.

In some embodiments of the first set, the method includes receiving live input from a human medical mentor. The step of generating response data includes mentor response data based at least in part on the live input.

In some of the embodiments of the first set, the step of generating response data includes generating trainee assessment data that indicates performance of the trainee, and the method includes presenting the trainee assessment data.

In another set of embodiments, a method includes receiving from a trainee action data that indicates a requested action relevant to dealing with a patient having an abnormal condition. Mentor response data is determined based on the action data, data describing the patient having the abnormal condition, a knowledge base rule, and at least one pedagogical rule of a set of pedagogical rules. The mentor response data indicates expert advice from a mentor. The set of pedagogical rules includes a null response rule, a guided response rule, and an intervention rule. In the null response rule, the mentor response data is empty; and the trainee is taught through self-discovery. In the guided response rule, the trainee is directed to consider at least one of a deficiency in the requested action, an alternative action, and a topic in a knowledge base. In the intervention rule, the requested action is modified or prevented. Data based on the mentor response data is presented to the trainee.

In other sets of embodiments computer readable media, and systems deliver medical care by improving decision-making skills by medical personnel who deliver the care using one or more of the above methods.

The techniques lead to advantages over the prior art approaches. For example, some embodiments reflect clinical reality rather than a subset of allowed protocols for assessing a disease. Some embodiments allow an author to more easily design tools that will behave consistently and avoid conflicts in simulation. Some embodiments allow a trainee to choose any tool and have a plausible result returned. Some embodiments allow the instance of the patient to change dynamically in response to actions taken by the trainee to alter its state. In some embodiments, the patient data sets are rich in detail and knowledge, and evolve as new classes of anatomical units are added. Some embodiments use data structures that may serve as a de facto standard for exchanging patient data. Some embodiments allow a physician to experiment with actions to take with an actual patient.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that illustrates at a high level a method for training medical personnel according to an embodiment;

FIG. 4 is a block diagram that illustrates a computer system upon which an embodiment of the invention may be implemented.

DETAILED DESCRIPTION

Figure 1:
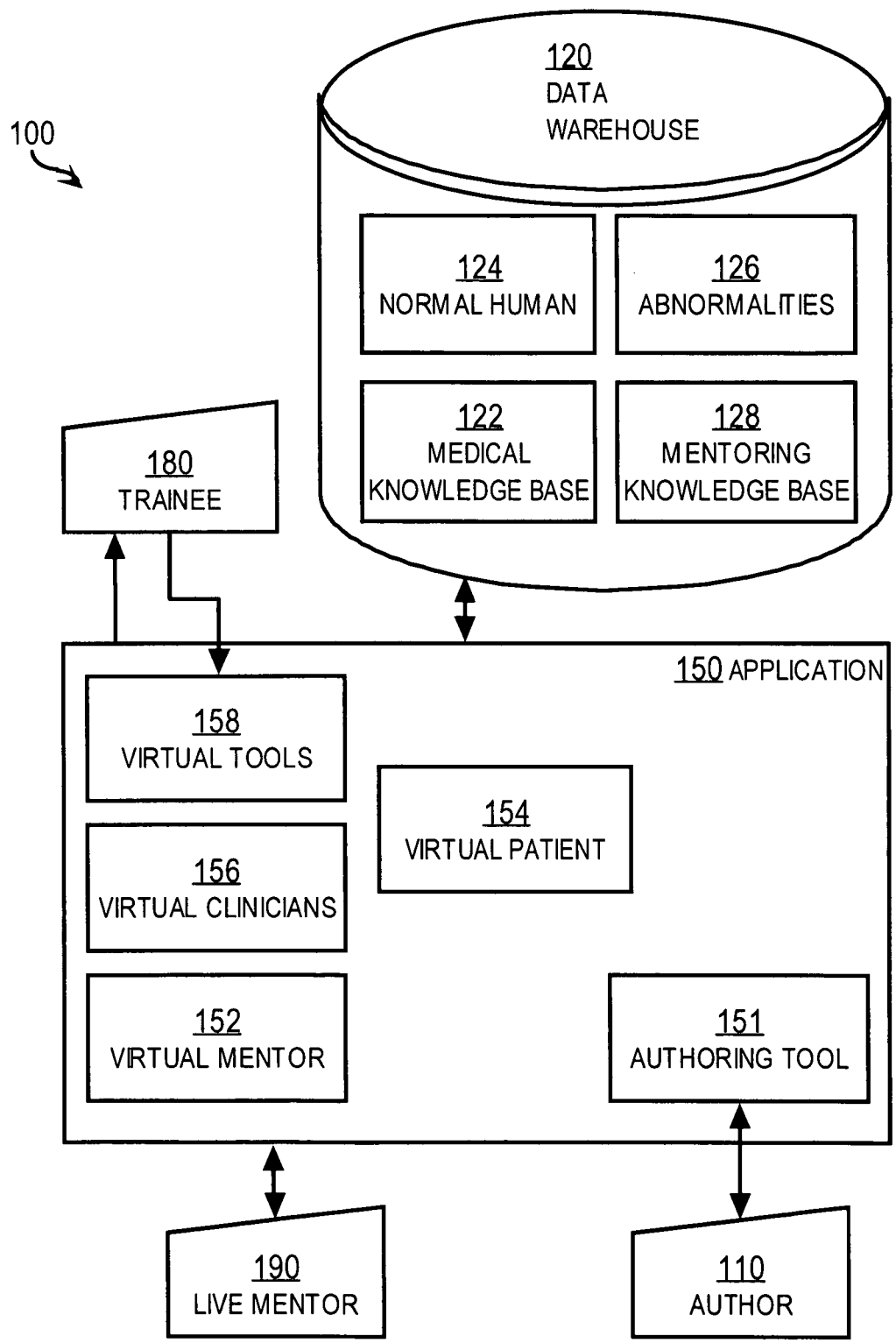
FIG. 1 is a block diagram that illustrates a virtual mentoring system at a high level, according to an embodiment.

A method and apparatus are described for delivering medical care by improving decision-making skills of medical personnel. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention are described in the context of teaching medical residents to use cognitive skills in treating human patients, but the invention is not limited to this context. In other embodiments, other medical personnel such as nurses, veterinarians and technicians are taught to deal with patients, either human or other animal. In some embodiments, a system is used by any medical trainee, including a medical professional who has been previously trained. In some embodiments, a system is used for teaching, for assessing either by a third party or self without credentialing, and for credentializing. In some embodiments, a virtual patient or virtual mentor is authored based on an actual patient and used by one or more physicians to accumulate data about the actual patient, exchange data about the actual patient, develop a complex diagnosis protocol for the actual patient or similar patients, and experiment with a treatment procedure for the actual patient or similar patients, or to perform some combination of activities to support the delivery of medical care to the actual patient or similar patients.

In the illustrated embodiments a virtual patient is used. The use of a virtual patient provides a great advantage, because no predefined protocols are needed for a trainee to interact with the virtual patient. The virtual patient represents physical conditions of a patient that can be discovered by a trainee no matter what sequence of tests or procedures the trainee orders. If the trainee causes a change in the physical condition of the virtual patient, that change is recorded and later tests will show the effects of the change wrought by the trainee.

Another advantage of the virtual patient that describes measurable attributes is that it does not require and is not limited by a label or human conceptual model superimposed on its existence. An abnormal mass has size, position, density, temperature, and differing opacity at different wavelengths of electromagnetic or acoustic waves or other imaging phenomena. It is not a priori a cancer or a sprain. Combinations of diseases can be simulated and new diseases can be simulated as readily as established diseases.

Working in concert with the virtual patient in the illustrated embodiment, is a virtual mentor that may employ any of several pedagogical approaches to teaching the trainee the medical knowledge represented by that mentor. The approach chosen depends on the state of the trainee and experience of live mentors as acquired using knowledge based engineering principles. This provides a great advantage over other training systems that take a single approach, such as preventing the trainee from deviating from a set of one or a few predefined protocols. In the illustrated embodiment, at least three pedagogical approaches or "rules," are allowed, alone or in combination: 1] a null response: 2] a guided response; and 3] an intervention. In a null response rule, no mentor response or a limited response is given to a trainee, whereby the trainee learns through self-discovery. In a guided response rule, the trainee is directed to consider a deficiency in a requested action, an alternative action, or a topic in a knowledge base, or search elements to use in a search engine, or some combination, based on knowledge in a medical knowledge base. Some aspects of learning, through searching topics in a search engine, are included in the concept of self-discovery. In an intervention rule, an action requested by the trainee is modified or prevented by the mentor based on knowledge in the medical knowledge base. In other embodiments, more or fewer pedagogical rules are allowed.

1. Structural Overview

FIG. 1 is a block diagram that illustrates a virtual mentoring system 100 for improving the delivery of medical care at a high level, according to an embodiment. More details are provided in a later section. System 100 includes a data warehouse 120 which provides data storage and management for information used by the system 100 and includes an application 150 that utilizes the data in data warehouse 120 and input from an author and trainee to teach cognitive skills to the trainee. In the illustrated embodiment, input from a live mentor is also included. While the author, trainee and live mentor, per se, are not elements of the system 100, one or more input/output (I/O) devices 110, 180, 190 to prompt and receive input from them are part of the illustrated system 100.

Data warehouse 120 is any non-volatile storage device or system known in the art, including a single node or multi node network storage system and one or more databases with database servers. In the illustrated embodiment, data warehouse 120 includes a medical knowledge base 122, data describing a normal human 124, data describing abnormalities 126, and a medical mentoring knowledge base 128, also called a pedagogical knowledge base. Medical knowledge base 122 is any medical knowledge base known in the art, and may include facts, decision trees, inference rules, and any other form of medical knowledge known in the art for training or other purposes, for example, as described in more detail in a later section. A database of medical knowledge is called "ontological" data and an object oriented medical knowledge database comprising multiple "ontological classes" is described in more detail in a later section.

The data describing a normal human 124 may be any data, including diagrams, photographs, vital statistics, and imagery data. In some embodiments, data 124 for normal human data includes visible human data as described in more detail in later sections. In an illustrated embodiment, normal human data 124 include medical cross-sectional images from a visible human, regions of cross-sectional images that are associated with anatomical features, and volumes within a human defined by a mesh of three dimensional coordinates called a polymesh associated with anatomical units. As described in more detail in a later section, normal human data also includes mappings that relate a polymesh and an image region with an anatomical class defined by physical properties and processes of anatomical units as stored in the medical knowledge database 122. In an illustrated embodiment, the physical properties and processes in an anatomical class may include any or all, but are not limited to, the following: size, location, anatomical relationships (e.g., anterior to), electromagnetic imaging characteristics, metabolic function, response to perturbations, and evolution with time.

The data describing abnormalities 124 may be any data describing diseased or damaged anatomical units, including cross-sectional images of tumors, abscesses, foreign objects, and data describing toxins or other byproducts of abnormal processes, including their progression with time.

According to embodiments of the invention, disease processes are best viewed as abnormalities with anatomic, physical, pathological and physiological attributes. An abnormality eventually becomes described, and thus diagnosed, by a trainee as it is investigated by modalities that reveal these attributes. The attributes are discoverable by the trainee by virtue of their local, regional and systemic characteristics and the investigative capabilities of diagnostic questions, examinations, devices and procedures available to the trainee. For example, an abnormality in the lumen of the colon, such as a colon cancer, has physical "visibility" attributes relating to the human eye aided by an endoscope, X-ray and magnetic imaging, as well as a pathological "vascularity" attribute that is indirectly related to X-ray visibility if intravenous (IV) contrast is administered. A device employed to visualize the abnormality must have characteristics that correspond to a patient abnormality attribute for a result to be generated for the trainee.

The mentoring knowledge base 128 is any data that describes pedagogical approaches to teaching medical cognitive skills. In an illustrated embodiment, mentoring knowledge base 128 includes a set of pedagogical rules such as the null response rule, the guided response rule, and the intervention rule, and means for determining which to use, as described in more detail in a later section.

Application 150 is a process, such as a process based on computer instructions executed by a one or mores processors on one or more general purpose computers, as described in more detail in a later section. Data used for process 150 comes from data warehouse 120 and input/output (I.O) devices 110, 180, 190 for an author, trainee and live mentor, respectively. Although drawn as three separate I/O devices, in other embodiments, more or fewer I/O devices may be used. Application 150 performs steps in a method for improving cognitive skills of medical personnel, as described in more detail below with reference to FIG. 2.

In an illustrated embodiment, application 150 includes other sub-processes that divide the work of application 150. The other sub-processes, sometimes called "agents," may execute in parallel or sequentially or in any combination. The sub-processes include an authoring tool 151, one or more virtual mentor agents 152, a virtual patient 154, one or more virtual clinician agents 156 and one or more virtual tools 158, all described in more detail in a later section as methods of objects in an object oriented programming approach.

The authoring tool 151 performs steps that allow an author to develop an instance of a virtual patient based on the normal human data 124 and one or more items from abnormalities data 126, as described in more detail in a later section. In some embodiments, authoring tool 151 performs steps to generate the normal human data 124 and abnormalities 126 and agents, such as the virtual mentor 152, the virtual clinicians 156, and the virtual tools 158. In some embodiments, authoring tool 151 performs steps to generate portions of the medical knowledge base 122 and the mentoring knowledge base 128.

The virtual mentor agent 152 provides responses from a virtual mentor to a trainee based on a pedagogical model (a set of pedagogical rules as described above, also called a mentor model) and a pedagogical logic processor and one or more mentor personalities, representing different medical specialties or differing opinions within the same specialty, as described in more detail below. In some embodiments, the pedagogical knowledge base 128 is also updated in response to input from the live mentor, if present, through I/O device 190. In such embodiments, input from the live mentor is captured in a pedagogical knowledge acquisition process, reviewed by knowledge engineers and validated or evaluated in a pedagogical knowledge validation process in consideration for updating the mentoring knowledge base 128 or medical knowledge base 122, or both, as described in more detail in a later section.

The virtual patient object 154 stores data for the instance of the virtual patient and includes functions that retrieve that data or change the state of the instance of the virtual patient in response to actions on the virtual patient by one or more virtual clinician agents and to modify the properties of the instance of the virtual patient based on the passage of time.

The virtual clinician agents 156 act on the current instance of the virtual patient based on actions requested by the trainee. For example, if a trainee asks for vital signs, a nurse practitioner virtual clinician interacts with the current instance of the virtual patient to obtain the vital signs data. If a trainee directs that an arm be amputated, and a mentor allows it, a surgeon virtual clinician interacts with the current instance of the virtual patient to remove the designated arm.

Virtual tools 158 are the means by which the trainee indicates the actions that are to be performed. In illustrated embodiments, the virtual tools are presented to a trainee through a user interface, using such interactive elements as icons and data forms. Virtual tools represent vital signs measurements, surgical procedures, diagnostic tests, equipment and other tools to be used in actions to be performed. In an illustrated embodiment, the trainee is presented with icons representing tools for asking a question of the instance of the virtual patient; requesting file data about the instance of the virtual patient; requesting a diagnostic test be performed on the instance of the virtual patient; requesting an imaging procedure be performed on the instance of the virtual patient; requesting a surgical procedure be performed on the instance of the virtual patient; and prescribing a treatment for the instance of the virtual patient, including drug and physical therapy. The selected actions are then performed by the appropriate virtual clinician 156.

In some embodiments, application 150 includes a session manager that controls interaction with one user (such as a trainee, author, or live mentor) at an I/O device and a session synchronization server that coordinates interactions with other users (e.g., other trainees and live mentors) as shown in more detail in a later section, with reference to FIG. 3B. In some embodiments, application 150 includes a domain model and domain logic processor that runs scripts for the various agents and database servers, as shown in more detail in a later section. In an illustrated embodiment, the application 150 also tracks trainee knowledge with a trainee model. The trainee model keeps track of user preferences, trainee history and profiles, logs user actions, or evaluates user performance using objective measures, or performs some combination of these or other actions.

2. Functional Overview

FIG. 2 is a flow diagram that illustrates at a high level a method 200 for improving cognitive skills of medical personnel according to an embodiment. Although steps are shown in FIG. 2, and subsequent flow diagrams, in a particular order for purposes of illustration, in other embodiments, the steps may be performed in a different order, or overlapping in time or one or more steps may be omitted. More detailed steps corresponding to an embodiment of method 200 are described in a later section.

In step 210 normal patient data is received, for example, from visible human data stored in normal human data 124 in data warehouse 120. In some embodiments, receiving normal data includes selecting normal data based on gender, age, race, or environment or some combination. In some embodiments, receiving normal patient data includes receiving data from an expert human author through an I/O device.

In step 220, abnormality data is received. In some embodiments the abnormality data is received from an author, for example, some of abnormalities data 128 is retrieved through I/O device 110 and selected or modified by an author at I/O device 110. For example, in some embodiments, abnormality data is generated by specifying deviations from normal values of one or more properties associated with an anatomical class. In some embodiments, data stored in data warehouse 120 is retrieved as the abnormality data during step 220.

In step 230 an instance of a virtual patient is generated as described in more detail in a later section. In some embodiments, steps 210, 220, 230 are performed using authoring tools 151.

In step 240, action data is received from a trainee, for example by selecting virtual tools 158.

In step 250 a response is generated. In an illustrated embodiment, step 250 includes steps 252, 254, 256, 258. In step 252 the application 150 interacts with a virtual mentor 152. For example, for a minimal guided response mode, during step 252 the virtual mentor 152 validates the action to determine whether the trainee provided valid information to perform the action and sends feedback to the trainee. For example, if the action indicates an arm be amputated, the validation step ensures that either the right arm or the left arm is specified. As a further example, the virtual mentor rates the action as good, bad or neutral and sends that rating back to the trainee as feedback. The virtual mentor in this example allows the action to proceed as intended by the trainee. Validation actions made by virtual mentors are based upon inferences which themselves are based upon the history of states of the virtual patient and medical knowledge 122 accessible to a virtual mentor 152.

As the trainee takes actions within the simulation, compartmentalized agents observed the actions and determined if data discovered by the trainee caused one or more of their rule-sets to become satisfied. Some rule-sets produce visible data seen by the trainee as described below.

Some rule-sets propose, prove or disprove an inference, thus placing an inference and its attributes into working memory. These working memory inferences are not visible to the trainee, but are visible to system agents, such as virtual mentors, for use in comparative purposes. An inference may represent an abstract concept (higher in the hierarchy of knowledge) or concrete concept (the terminal child in the hierarchy), and may indicate either a diagnosis, such as chronic gastrointestinal blood loss (abstract) or cecal adenocarcinoma (concrete), or an action including a diagnostic test or intervention, such as removal of portion of intestinal tract (abstract) or appendectomy (concrete). A virtual mentor gathers the inferences and their attributes from working memory. The virtual mentor observes the trainee actions to determine if future trainee actions are also included in the inferences in working memory. Thus any subsequent trainee action is either discordant or concordant with the list of working memory inferences substantiated from previous trainee actions. If concordant actions are taken by the trainee, then the action is evaluated as appropriate. Conversely, discordant actions taken by the trainee are interpreted as actions that had no proposed or proven inferential support and thus are evaluated as inappropriate. Depending upon the pedagogical design of the simulation, these assessments are used for solicited or unsolicited mentor feedback, such as for mentor intervention to intercept a trainee action in order to prevent it from occurring (preemptive error correction), for strategies to allow the trainee to self-discover an answer to a mentoring request at any point in the simulation, or for mentor assessment of trainee performance. It is noted that experienced mentors' responses vary from pure content to open-ended questions that allowed the trainee to determine the correct next action using the trainee's own knowledge and actions to obtain additional knowledge.

In step 254, the application 150 interacts with a live mentor through I/O device 190 to receive additional feedback. In some embodiments of step 250, step 254 is omitted. In some embodiments, feedback received from a live mentor is used to update the mentoring knowledge base 128.

In step 256, the application 150 interacts with a virtual clinician 156 to execute the action requested by the trainee and allowed by the virtual or live mentors. In an embodiment depicted below, the application 150 creates an instance of a virtual tool (e.g., a CT scan device) and creates an instance of a virtual clinician (e.g., a radiologist) to wield it. The virtual clinician processes the action by operating on the virtual patient with the virtual tool to retrieve the data provided by that tool. For example, the virtual clinician retrieves from the virtual patient a CT scan of a certain portion of the virtual patient. If the portion scanned transects only polymeshes associated with normal properties, a normal image is provided. If the portion scanned transects a polymesh associated with abnormal properties, an image with an abnormality imposed is provided.

It has been found that compartmentalizing the specialty decision-making into specialized agents (e.g., general surgeon or internist virtual clinicians) allows an author to think within specialty, expediting authoring. In addition, this design improves manageability of content and logic and minimized logic conflict.

In step 258, the virtual patient is updated. For example, if no affecting action is taken, such as during the CT scan, the patient's abnormality advances by the amount of time associated with the action. If an affecting action is taken, such as an amputation, the data in the virtual patient is updated to reflect the action, such as by removing the tissue in the amputated arm from the virtual patient.

As a result of step 250, a response is generated, including the CT scan retrieved by the clinician from the patient and the update to the patient. In an example depicted in more detail below, the response is sent to the virtual mentor 152 to add any comments based on the CT scan. A response from the virtual mentor 152 is added to the response data. In some embodiments, a response based on the result from the virtual patient is received from a live mentor. In some of these embodiments, feedback received from a live mentor is used to update the mentoring knowledge base 128.

In step 280 display data is derived from the response data and presented to the trainee. For example the CT scan is presented to the trainee, with any comments from the virtual or live mentor in some embodiments, and without some or all of those comments in other embodiments. Control then passes back to step 240 to allow the trainee to input a subsequent action.

In step 290, data based on the response is presented to a live mentor. For example, the CT scan and comments from the virtual mentor are displayed for the live mentor. In some embodiments, the response includes assessment of the trainee's performance. In some embodiments, during step 290, the live mentor modifies the comments of the virtual mentor, including any assessment of the trainee's performance, and the modifications are captured by the pedagogical knowledge acquisition process, reviewed, validated and used to update the pedagogical knowledge base (e.g., mentoring knowledge base 128). Final assessments are recorded in a log in the trainee's profiles.

There are several advantages to this approach. (1) It reflects clinical reality. (2) It allows the author to more easily design devices and investigative modalities in a way such that the device will discover an abnormality independently, thus automatically allowing internally consistent "bookkeeping" and avoiding conflicts in a simulation. (3) It allows the trainee to choose any investigative modality and to have returned a plausible result coherent with other findings, even though the trainee action may not have been anticipated by the author. (4) Lastly, if an abnormality and its attributes are removed by the trainee by some procedure or treatment, a procedure that previously demonstrated the abnormality would subsequently not visualize it. Thus the instance of the patient changes dynamically in response to actions taken by the trainee to alter its state. It is believed that this approach to creating a disease process corroborates accepted wisdom in knowledge based systems that the correct choice of conceptualization for a real world problem can greatly facilitate its computer-based solution.

3. Example Embodiments

In the following, the structures of system 100 and steps of method 200 are described in more detail with respect to example embodiments. The example embodiments are object-oriented processes that are implemented in hardware or software. In object-oriented processes, an object class (hereinafter "class") is a set of parameters ("attributes") and functions ("methods") that operate on values for those parameters. The functions are often implemented as software scripts that are compiled and executed as needed. The set of parameters and functions are the characteristics of the class. An object is an instance of the class that includes particular values for one or more of the parameters. In some embodiments, one or more parameters are other object classes with value corresponding to instances of those classes. In some embodiments, one or more parameters are object classes that represent relationships with other classes. Different classes may be hierarchically related, with sub-classes inheriting characteristics from more general supra-classes above them in the hierarchy.

In the example embodiments, ontological classes are defined to describe anatomically functional units that are clinically useful in simulating the behavior of a patient to diagnosis and treatment. Conceptually, an ontological class is one or more anatomical structures that function with integral characteristics that are clinically relevant. Ontological classes are determined by defining functional units as they come into play in health and disease, tailored especially for simulating patient response and case management. Some functional units describe normal and abnormal biochemical and biomechanistic pathways. For example, abnormal pathways describe disease processes that: a) have detectable starting points, b) develop and change over time, c) can be diagnosed from detectable signs, symptoms and tests, d) respond to intervention, and e) interact with any number of other processes. An ontological class may also represent non-anatomical structures, e.g. the patient's living conditions, familial relationships and medical history, among others. Ontological classes are stored in the medical knowledge base 122.

Ontological classes in a hierarchy represent different levels of granularity for a virtual patient. For example, ontological classes and supra-classes are defined to represent a gene, a protein, an organelle, a cell, a group of cells, a tissue, an organ, an organ system, a functional structure, the body as a whole, and a population of multiple bodies. In a more specific example, a group of cells in an area within the liver that function uniformly as hepatocytes define a hepatocyte class. An object of this class defines a group that contains a defined number of cells that function as a hepatocyte unit within a particular liver. A similar region, also within the liver, but having a different function for some clinical purposes define a different class, for example a region that functions as Kupffer cells define an object of a Kupffer class. A liver supra-class provides functions and parameters that are common to hepatocytes and Kupffer cells. A liver object of the liver class includes a hepatocyte object and a Kupffer object and provides values for parameters common to both. Another clinically useful ontological sub-class for a liver class is a site where a tumor could replace a portion of liver. In a particular instance of this class, i.e., in a liver tumor site object, the portion of the liver is identified and particular characteristics of the tumor are specified. The liver tumor site object is deleted to simulate removal of a tumor by a surgeon; and thus the liver tumor site class is clinically useful for simulations. In the example embodiments, the ontological classes are written to encompass the National Library of Medicine Medical Subject Headings (NLM MeSH) concepts. For any level of granularity, gaps will exist in the knowledge of biological mechanisms. These gaps are bridged by integrating knowledge derived from other knowledge sources, such as from clinical perspectives.

In the example embodiments, a virtual human is a data set including multiple ontological objects that describes functional features of a human. The set of objects represent a sufficient collection of ontological classes to reflect the structure and function of a human as a whole as needed to simulate normal or disease processes or both. In some embodiments, the degree of granularity is limited to that needed to support simulation for a particular use. Virtual humans are stored as objects (instances of ontological classes whose functions define the functionality of those classes). For example, the normal human data 124 includes a virtual human expressed as a collection of ontological objects. Representing virtual humans as a collection of objects permits extensibility by creating modular components of medical knowledge, which use standard ontological principles and an open-source format. In an example embodiment, anatomical structures to serve as classes are identified by using resources such as the Foundational Model of Anatomy (FMA) (Rosse, C. and J. L. V. and Mejino, "A reference ontology for bioinformatics: The Foundational Model of Anatomy," Journal of Biomedical Informatics, 2004, the entire contents of which are hereby incorporated by reference as if fully set forth herein).

In the example embodiments, ontological classes also represent virtual tools 158 and virtual agents, including virtual clinicians 156 and virtual mentors 152. A trainee within a user environment uses virtual tools to investigate and modify data within a virtual human. Virtual clinicians encapsulate the functionality used to perform an action or set of related actions requested by the trainee. Virtual mentors encapsulate the functionality used to guide a trainee in the diagnosis and treatment of a virtual human. These ontological classes are described in more detail below in the context of their functions.

Ontological classes are defined to contain attributes and methods necessary to completely describe a patient including: the entire medical, family and environmental history of the patient; certain components of physical examination; body fluids composition; visibility of certain components using imaging; how time and interventions might affect these components; and how these additional data might be linked to components in an original data set. Ontological class functions (e.g., scripts) provide operational rule sets that govern how an instance changes in response to interventions and time.

In the example embodiments, ontological classes, and thus ontological objects, do not contain image data. Thus, a virtual human does not include image data. In these embodiments, ontological classes do not necessarily represent anatomical structures visible in a particular image, for a variety of reasons. For example, the image may be produced by a measurement system that does not detect objects in the class or the image may be obtained at a given level of granularity that does not show objects in the class, or there may be no image available. The anatomical units in some classes might in reality intersect with other anatomical structures, contain other structures, and be composed of non-contiguous structures. Instead, appropriate mapping associates stored image data with one or more ontological objects.

In the example embodiments, image data constitutes visible human data. Visible human data is a finite collection of uniformly sized units of data, e.g., picture elements (pixels) and volume elements (voxels) representing different spatial positions such as along a cross-section or within a volume. Each unit has one or more values (e.g., a single grayscale value, or a triplet of red-green-blue values called RGB values), which, when displayed, convey information demonstrating the anatomy of a normal human at the spatial position represented. The visible human data is primarily image data obtained from measurement systems, including integrating images such as obtained from optical and X-ray exposures, and cross-sectional images such as obtained from computer aided tomography (CAT) scans, also called CT scans, and nuclear magnetic resonance (NMR) scans, also called magnetic resonance imagery (MRI).

In some example embodiments, one or more images in the visible human data are segmented into regions that have anatomical meaning. For example, segments of an image that represent the liver are distinguished from segments that represent other tissue, such as bone, muscle, heart, and lungs. In various embodiments, an author segments visible human data through manual segmentation or computer assisted segmentation, or both. It is anticipated that, as technology improves, segmentation will become a more automated computational process. In some embodiments, segmentation is completely automatic. In some example embodiments, the segment boundaries are combined across one or more images to form polymesh data. The polymesh data describes a three dimensional surface of a volume in a virtual human that operates as an anatomical unit.

Figure 3A:
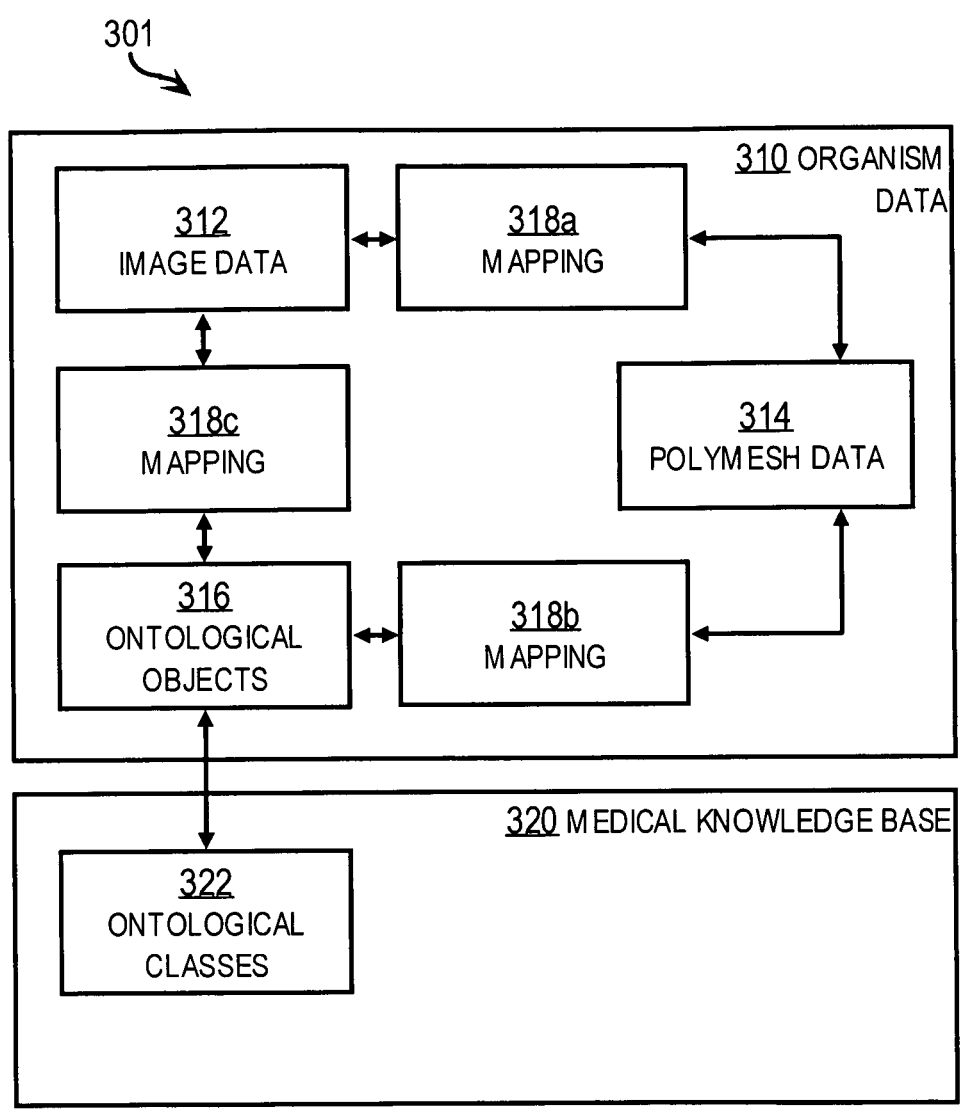
FIG. 3A is a block diagram that illustrates organism data that is used for representing an organism in the system, according to an embodiment

In the example embodiments, the normal human data 124 includes the virtual human, the visible human, the polymesh data, and mapping data that relates these data to each other. FIG. 3A is a block diagram that illustrates organism data 310 that is used for representing an organism in the system, according to an embodiment. The normal human data 124 and the abnormalities data 126 stored in data warehouse 120, and the virtual patient data 154 formed by the application 150 are examples of organism data 310. In some embodiments, one or more instances of the virtual patient data 154 are also stored in the data warehouse 120.

The ontological classes 322 for the organism are stored in the medical knowledge base 320, such as the medical knowledge base 122 in data warehouse 120. The organism data 310 includes ontological objects 316, which are instances of the ontological classes with specific values for the parameters of the class. The organism data 310 includes image data 312, which represent the various integrated and cross-sectional views of the organism collected by various measuring systems. The organism data 310 also includes polymesh data 314 that describes the surfaces of volumes that are treated as an anatomical unit at some level of abstraction. Subsets of data can be designed and extracted for the accomplishment of specific tasks.

The organism data 310 also includes mapping data 318a, 318b, 318c (collectively referenced hereinafter as mapping data 318). The mapping data 318 includes data that relates entries in the other data to each other.

For example, mapping data 318a relates entries in the image data 312 to entries in the polymesh data 314, which is easily formed as the polymesh data 314 is generated from the image data 312. In some embodiments, the polymesh data 314 is stored with the image data 312. In these embodiments, the mapping 318a is trivial and accomplished by any of several methods, including juxtaposition of each element (e.g., voxel) of the polymesh data 314 to the associated elements (e.g., pixels) in the image data 312, and pointers between the voxels and a set of pixels, among others.

Mapping data 318b relates entries in the polymesh data 314 to objects in the ontological objects data 316, which are readily determined because the polymesh data often represents anatomical features that are also ontological classes at some level in the hierarchy of ontological classes. In some embodiments, the mapping 318b relates polymesh data to ontological classes 322 and those mappings are inherited by the ontological objects 316. In the illustrated embodiment, the mapping data includes mapping data 318c, which relates objects in the ontological objects data 316 to entries in the image data 312. In some embodiments, the mapping 318c relates ontological classes 322 to the image data 312 and those mappings are inherited by the ontological objects 316. The mapping 318c is readily formed based on the mapping 318b between the ontological objects and the polymesh data, and the mapping 318a between the polymesh data and the image data. In some embodiments in which the polymesh data 314 is stored with the image data 312, mapping 318b is omitted.

In the example embodiments, the image data 312 includes the visible human. The visible human is a National Institutes of Health (NIH) sponsored project in which several complete humans were completely CT and MRI scanned and then serially sliced into a set of corresponding detailed anatomic images.

In an illustrated embodiment, an OntoSem ontology is defined. The OntoSem ontology includes classes of objects (e.g., drug, cell) and events (e.g., colon-cancer, perform-surgery) in the world. Example relations include agents, e.g., the agent of a "perform-surgery" event class is a "surgeon" class). A class for the event "colon-cancer" reflects a general-domain granularity of knowledge acquisition, prior to medical specialization. A class shows inherited properties. For illustration, one of two lines of inheritance for "colon-cancer" in an embodiment is described. The "colon-cancer" class inherits from a "cancer" class which inherits from a "non-communicable-disease" class which inherits from an "animal-disease" class which inherits from a "pathologic-function" class which inherits from a "biologic-function" class which inherits from an "animal-living-event" class which inherits from a "living-event" class which inherits from a "physical-event" class which inherits from an "event" class which inherits from an "all" class at the root of the OntoSem ontology.

The OntoSem ontology is fundamentally different from most other "ontologies" in its emphasis on rich property-based descriptions that are not present in the many hierarchical trees of words or concepts available both within the medical domain (e.g., Unified Medical Language System [UMLS]) and outside of it (e.g., WordNet). Some such ontologies include properties, but their inventory and application is more limited. Concepts in OntoSem are connected hierarchically through subsumption relations, so that properties defined in ancestor concepts (metaclasses) are valid in the descendant concepts, unless overtly overridden. OntoSem permits multiple inheritance: for example, animal-disease class inherits both from medical-event class and from patho-logic-function class. At the time of this writing, the OntoSem ontology contains about 6,500 concepts (events, objects and properties), with, on average, 16 properties each. The ontology includes both general purpose and biomedicine concepts.

OntoSem supports the encoding of complex events as scripts, which represent typical sequences of events and their causal and other relationships. Scripts provide information that is very useful in general reasoning, natural language processing and molecular biology. Scripts represent how individual events may hold well-defined places in routine, typical sequences of events that happen in the world, with a well-specified set of objects that fill the different roles throughout that sequence. For example, if the sequence of events describes a colonoscopy, the participants will include the physician carrying out the procedure, the patient, and any number of other medical personnel; the tools will include the colonosope, various monitors and anesthesia; other props will include the operating table and medical gloves and gowns; events will include anesthetizing the patient, carrying out various procedures with the colonoscope; and so forth. Scripts can contain subscripts (e.g., the scripts of prepping and anesthetizing a patient), and they can be more or less fine-grained, depending on the reasoning required by a given application. The component events are often optional; they may stand in a disjunctive relation with some others (that is, of several components only one may actually be realized in a particular instantiation of the script); and their relative temporal ordering may be partial.

Scripts tend to belong to a class and are not instantiated separately. Component events in a script have a special status. They are not regular instances of classes, as no instantiation occurs, but their semantics are different from those of the general classes to which they are related by name. Thus, the event of anesthetizing a patient as part of a colonoscopy script involves constraints different from those in an anesthetize class.

The contents of scripts included in classes are driven by the needs of simulation, meaning that they typically do not represent all known molecular mechanisms and that they may be abridged for simplicity in embodiments where detail is not needed. For example, the precise path of the tyrosine kinase biochemistry may or may not be necessary even though it is known that there is an array of biochemical pathways. However, many embodiments that use abridged versions also use the accurate beginning and ending biochemical structure nomenclature so that if a finer granularity script is later required for new simulations, or new relevant knowledge is discovered, the finer granularity script can be incorporated accurately and easily in other embodiments.

In an illustrated embodiment, subject matter experts (a biochemist in molecular genetics, a physiologist with molecular expertise, a diagnostic and therapeutic clinician, and a radiologist) follow two complementary cross-level perspectives to generate multiple hierarchies of objects and events. The first perspective is from the gene up into the organism ("gene-up"); and the second perspective is from population medicine down into the organism ("population-down"). The complete spectrum of granularity levels thus produced extends through gene, nucleus, cell, tissue, organ, organ system, body and population. Several databases are used as guides for the structured content of the functional units. For biomechanistic information, medical school curriculum resources and ProteinLounge™, a large dataset of biochemical pathways and associated information organized in a useful format, are used. For population medicine, clinical knowledge, Cochrane Reports and other useful NLM references, are used. For anatomical information, the FMA data set is used.

In step 210, normal patient data is received. As described above, step 210 includes receiving normal human data 124 from data warehouse 120. In the example embodiments, step 210 includes forming the ontological classes 322 and normal human data 124 and storing the normal human data 124 in data warehouse 120. In these embodiments, an author forms and stores the ontological classes 322 based on image data 312 and polymesh data 314. The author uses those classes to form an instance of a virtual normal human as ontological objects 316. The same ontological classes can be used to form other normal humans. The following sequence is used by authors in an example embodiment to create ontological classes representing normal anatomically functional units:
  author obtains visible normal human data 312;
  author segments visible normal human data into a collection of anatomical regions;
  author creates anatomical polymesh data 314 from anatomical region;
  author maps anatomical region to anatomical polymesh to form 318a;
  author creates empty ontological class within classes 322 from anatomical region;
  author maps anatomical region of image data 312 to ontological class as part of 318c inherited by objects 316;
  author maps anatomical polymesh to ontological class as part of 318b inherited by objects 316;
  author inserts ontological class into hierarchy of ontological classes 322;
  author relates ontological class to other ontological classes;
  author scripts function data into ontological class;
  author populates ontological class with static property data; and
  author repeats process until all anatomical regions are complete and ontological classes 322 are complete.

In the example embodiments, an instance of a virtual human is generated during step 210. The following sequence is used by an author to create an instance of a virtual normal human:
  author conceptualizes virtual normal human;
  author creates instance of virtual human;
  author populates virtual human with objects 316 from normal ontological classes 322;
  author populates or modifies properties of normal ontological classes with local instance property data in objects 316;
  author populates virtual human with global instance property data in objects 316;
  author inserts objects 316 and mappings 318 and data 312, 314 as instance of virtual normal human 124 into data warehouse 120.

The virtual normal human is used in the process of creating virtual abnormal human to serve as a virtual patient.

In an illustrated embodiment, specific structures and functions of a single organ, the stomach, is used to define at least part of the virtual normal human. The classes for this embodiment include: Cell of Cajal (an intestinal pacemaker cell); gastric mucosa (parietal and antral); gastric wall components; pain fibers; lymphocytes and polymorphonuclear neutrophiles (PMNs), a receptor blocker and agonist (imatinib and Epidermal Growth Factor [EGF]); a hormone (gastrin); a bacterium (*H. pylori*); and several chemotherapy, anti-bacterial, and anti-inflammatory drugs. The classes include scripts for a set of encoded pathways at the cellular level, including specific metabolic pathways, drug pathways, cell membrane/extracellular function pathways and growth control pathways.

The biomechanisms of a normal Cell of Cajal into encoded as functional units (e.g., OntSem classes). This cell possesses (1) the kit gene, which codes for (2) the transmembrane kit protein receptor, which is constitutively stimulated by (3) extracellular EGF ligand, and through the kit receptor, affects the (4) tyrosine kinase biochemistry, which affects the (5) cell growth cycle mechanisms. These five mechanisms at a given level of granularity are combined to form a clinically relevant pathway, which is encoded within the Cell-of-Cajal class script. This Cell-of-Cajal class script also includes the following facts. (1) The functions of the transmembrane kit protein receptor are properties derived from the kit gene. (2) Functions of the transmembrane kit protein receptor are: to respond appropriately to extracellular EGF ligand binding, to upregulate the tyrosine kinase pathway, and to respond to receptor blockade by downregulating the pathway. (3) The tyrosine kinase pathway exercises control of the cell growth cycle and can up- and down-regulate cell growth. (4) The range of normal constitutive growth behaviors of the Cell of Cajal is defined using observational studies in the pathological literature.

In step 220, abnormality data is received from an author. As described above, step 220 includes receiving abnormalities data 126 from data warehouse 120. In the example embodiments step 220 includes forming ontological classes 322 for abnormalities and forming abnormalities data 126. The following sequence is used by authors to create ontological classes representing abnormal anatomically functional units. These abnormal ontological classes inherit from normal ontological classes.

Author conceptualizes abnormal human data;
    author obtains visible abnormal human data and stores in image data 312 for abnormal organism;
    author segments visible abnormal human data into collection of abnormal anatomical regions;
    author creates abnormal anatomical polymesh from abnormal anatomical region and includes in polymesh data 314 for instance of abnormal organism;
    author maps abnormal anatomical region to abnormal anatomical polymesh and adds to mapping 318a for instance of abnormal organism;
    author identifies normal ontological class from abnormal anatomical region;
    author creates abnormal ontological class and adds to classes 322;
    author establishes inheritance of abnormal ontological class from normal ontological class;
    author maps abnormal anatomical region to abnormal ontological class and adds to mapping 318c for instance of abnormal organism;
    author maps abnormal anatomical polymesh to abnormal ontological class and adds to mapping 318b for instance of abnormal organism;
    author inserts abnormal ontological class into hierarchy of ontological classes 322;
    author relates abnormal ontological class to other ontological classes;
    author scripts function data into abnormal ontological class;
    author populates abnormal ontological class with property data to form abnormal objects 316 for instance of abnormal organism; and
    author repeats process until all abnormal anatomical regions are complete.

In some embodiments, image data 312 and polymesh data are shared among different instances of organism data 310, e.g., the normal human data 124 and abnormalities data 126. In some embodiments the shared data is stored in a common area of data warehouse 120. In some embodiments, some or all of the shared data is replicated in each instance of organism data, e.g., in the normal human data 124 and abnormalities data 126.

In these example embodiments, the author creates the mappings 318. In these embodiments, the mappings created between the ontological classes 322 and objects 316 anatomical regions of images 312, and anatomical polymeshes 314 reside with the image data 312 associated with the mapping. This creates a stationary foundation of data upon which different sets of image data can be utilized to form different instances of organism data 310. The schema of data sets and mappings is shown in FIG. 3A. This schema allows an author to design a normal or abnormal virtual human, or other organism, without the need to sift through volumes of image data. By virtue of the mapping mechanisms, image data is automatically and appropriately associated with the ontological objects that define the virtual organism 316.

In the illustrated embodiment, mechanisms for the common general pathological processes of neoplasia, inflammation, and infection, their evaluation and management, and their effects on the stomach are simulated by the abnormalities data. As an example of the gene-up perspective, the mechanisms and pathways necessary to generate a Gastrointestinal Stromal Tumor (GIST), a tumor of the Cells of Cajal, are established. The effects of an abnormal Cell of Cajal—as by mutation of a kit gene—is encoded using combined lateral selectional constraints on property values from the normal Cell-of-Cajal script. For example, if a "has-object-as-part" property of the Cell-of-Cajal class includes an object indicating "kit gene" with the "status" property holding data that indicates "mutated," then a cascade of events are set off, created from encoded knowledge, that form the following pathway: (1) the mutated kit gene encodes for an abnormal kit protein receptor, which (2) upregulates its response to EGF binding, which (3) upregulates the tyrosine kinase pathway, which (4) upregulates the growth cycle control. The abnormal Cell-of-Cajal class script also includes, as a fact, the range of abnormal growth behaviors of the Cell of Cajal based on observational studies in the pathological literature.

In step 230 an instance of a virtual patient is generated. In example embodiments, a virtual patient includes an instance of a virtual human within a user interface and including zero or more abnormalities.

The following sequence is used by an author to create a virtual abnormal human used in organism data 310 that serves as a virtual patient 154. A virtual abnormal human inherits from a virtual normal human. By doing so, many of the tasks necessary to create the virtual human have already been completed. Only those tasks involving the addition of abnormalities and personalized global property data need to be completed.

Author conceptualizes virtual abnormal human;
    author creates instance of virtual human as ontological objects 316;
    author establishes inheritance for virtual human from virtual normal human;
    author populates or modifies properties of normal ontological classes with local property data;
    author populates virtual human with objects from one or more abnormal ontological classes;
    author populates or modifies objects of abnormal ontological classes with local property data;
    author removes appropriate objects of normal ontological classes from virtual human;
    author populates objects 316 of virtual human with global property data; and
    author inserts virtual human 316, with mappings 218, and data 312, 314 into data warehouse 120 as organism data 310 that serve as virtual patient 154.

In various embodiments, one or more abnormalities within a virtual human are created by: (1) the addition of an abnormal ontological class (e.g., virtual patient has a parasite), (2) the removal of a normal ontological class to represent an abnormality by virtue of the missing normal ontological class (e.g., virtual patient has no leukocytes), (3) the replacement of a normal ontological class with an abnormal ontological class (e.g., virtual patient has a tumor in the liver), or some combination.

The knowledge necessary for the creation of virtual patients is modeled ontologically (e.g., with OntoSem classes). Specific virtual patients and events associated with them (e.g., medical conditions or diagnostic procedures) are represented as time-sensitive instances of ontological concepts in a fact repository, often in the data warehouse 120. The fact repository also provides the basis for comparison of student performance over time and for performance evaluation of both the student and the system itself.

For example, an author selects a patient template and supplies an initial state—which includes selecting an abnormality and providing initial biophysical property values. In some embodiments, the author selects specific paths that the patient takes at branch points in the domain script: e.g., a biomechanistic disease process is selected to either respond or not respond to stimuli during simulation. For any choices the author leaves unspecified, the system uses a random or statistically grounded selection strategy. This authoring process sets up the entire data set to fully represent the virtual patient at run-time for an intended purpose. For example, a stomach abnormality that is a tumor-producing gene defect is provided with a starting point, as well as an actual starting size and growth rate selected from a population-derived range of rates. At the outset, this abnormality might not be clinically detectable by the user within the simulation, but the growth rate over time will make the tumor detectable using the diagnostic tools available to the user.

In an illustrated embodiment, an arbitrary segment of the gastric wall of an instantiated virtual patient is populated with an abnormal Cell of Cajal tissue object. The altered pathway is instantiated in this object at initialization to simulate a tumor. The following facts and behaviors occur. The kit protein receptor is clinically discoverable through selective staining techniques on pathological specimens obtained by biopsy of the tumor. Administering a clinically useful drug such as imatinib (a kit receptor blocker), will block the kit protein receptor and result in automatic downregulation of the growth cycle and diminution of growth in the actively proliferating cells. Administering a specific anticancer drug that suspends the growth cycle will result in cessation of proliferation in the actively proliferating cells. Performing hypothetical gene therapy to replace or override a mutated kit gene to create normal function will have a negative effect on proliferation over time. These behaviors are only revealed when a user employs appropriate virtual tools to evaluate or treat the virtual patient, as described in the next step.

In another illustrated embodiment, an abnormality that an author inserts in the stomach of a virtual patient includes a gastric ulcer associated with *H. pylori*. The ulcer, modeled as a segment of abnormal tissue, is simulated by creating a functional unit that contains the entire pathological repertoire of processes in an ulcer, with its own unique, abnormal structure, growth and disrupted function due to *H. pylori*. The ulcer continues to change qualitatively and/or quantitatively in either direction (e.g., it can grow or it can heal) and is detectable through diagnostic procedures and treatable through therapeutic procedures. Modeling this complex process is straightforward because the biomechanisms are well-described, the ulcer involves largely local processes, and the clinical management is well-defined.

In some embodiments, population-based empirical clinical knowledge is used where mechanisms are not so thoroughly understood. Computationally, both explained and empirically observed processes in the same knowledge representation schema are represented by adding non-mechanistic bridging to causal chains in scripts. These bridges are modeled using population studies and contain stochastic information. In the GIST tumor, the genetic mechanisms that control phenotypic expression are not known, requiring population-based information for complete description. For example, a biomechanism is not known explaining why the tumor has a specific doubling time, so this property is derived from clinical studies. A similar, large arena of unknown biomechanisms relates to systemic symptoms. For example, it is not known when a process causes the symptom nausea. To bridge this gap and automatically produce the symptom, a link between a gastrointestinal structural process and the symptom nausea is established on the basis of empirical clinical knowledge. The bridge is triggered by biological data (e.g., 10 cm diameter tissue in the lumen of a hollow GI organ) and outputs biological data (e.g., stimulate local gastric neurons connected to the nausea center in the brain). This then facilitates autonomous simulation of the symptom nausea when a GIST in the stomach (or more abstractly, when any mass in any hollow GI organ) reaches a requisite size.

At the beginning of a simulation session, the system presents the trainee with a virtual patient about whose diagnosis the trainee initially has no knowledge.

In step 240, action data is received from a trainee. In an illustrated embodiment, the trainee selects diagnostic and treatment options using a menu-based (essentially, multiple-choice) interaction system. In some embodiments, a natural language-based interaction is used. In an illustrated embodiment, the trainee selects among virtual tools 158, which are objects to interact with a virtual patient. These interactions may be investigative or interventional. When an investigative virtual tool is employed by the trainee, data is obtained from the virtual patient. When an interventional virtual tool is employed by the trainee, data within the virtual patient is changed. For example, a virtual tool that represents a lab test or a history question reveals data from the appropriate virtual patient data to the trainee. A virtual tool that represents a surgical procedure or a medication will change virtual patient data. In the example embodiments, virtual tools are stored as ontological classes, and instantiated as objects when employed by a trainee. Examples of virtual tools include, among others, a medical device such as a colonoscope, a medical procedure such as an exploratory laparotomy, a medical imaging procedure such as a CT scan, a medical lab test such as a complete blood count (CBC) or blood culture, and a medical drug such as penicillin.

The following sequence is used when an author creates an ontological class representing a virtual tool.
author conceptualizes tool;
author creates empty ontological class representing tool;
author inserts ontological class into hierarchy of ontological classes 322;
author populates ontological class with property data;
author relates ontological class to other ontological classes; and
author scripts function data into ontological class.

In step 250 an appropriate response is generated. For example, if the trainee removes an organ surgically in the simulation, this action removes the organ from the data representing the patient. It the trainee performs an imaging test such as a CT scan, then the system provides an appropriate result congruent with the current state of the patient, e.g., after organ removal based on a prior surgical procedure. If the trainee requests an unexpected test or exam that should be normal in this disease, then the system returns a normal result.

A trainee would observe the patient change with time if it were appropriate for the given disease and a correct intervention (or incorrect intervention).

In the example embodiments, step 250 includes steps to interact with virtual agents. In these embodiments, a virtual agent represents either a virtual clinician or a virtual mentor. Each virtual agent may perform at least one of three roles within the user interface. These roles are: (1) to provide the basic functionality to process the interactions requested by the trainee, (2) to provide the trainee with guidance through the user interaction based upon a proscribed pedagogical design, (3) to provide an assessment of trainee actions.

These virtual agents are invoked when needed. For example, a virtual surgeon only becomes active within the user environment when the trainee selects a surgical procedure. There may be any number of virtual agents active in the user interface at any given time. Throughout the course of its existence, a virtual agent monitors the events within the user interface in order to respond appropriately. By encapsulating monitoring and response functions within an object class, an author can not only design new virtual agents with inherited functionality, thus easing the process of authoring, but virtual agents can also be easily interchanged in order to simulate different environments with different characteristics. In the example embodiments, virtual agents are stored as ontological classes. A virtual clinician is a virtual agent that replicates the functionality of a clinician within the user interface by taking on the first role. A virtual mentor takes on the second role or third role or both.

A virtual clinician takes on the first role, for example, by wielding the virtual tools selected. For example, a virtual endoscopist wields the virtual colonoscope; a virtual surgeon performs the exploratory laparotomy, a virtual radiologists performs the CT scan, one or more virtual pathologists performs the CBC and blood culture, and a virtual nurse administers the penicillin.

The following sequence is used when an author creates an ontological class representing a virtual clinician. These virtual clinicians are employed when a trainee requests an action, whether investigative or interventional. They encapsulate the functionality to carry out the requested action.

Author conceptualizes clinician;
author creates empty ontological class representing clinician;
author inserts ontological class into hierarchy of ontological classes 322;
author populates ontological class with property data;
author relates ontological class to other ontological classes; and
author scripts function data into ontological class.

A virtual mentor is a virtual agent that monitors the events within the user interface and proposes, proves and disproves inferences based upon the data currently available. Through the use of these inferences, judgments can be made at a higher level of computation in order to perform clinical decision-making and trainee assessment. Virtual mentors are designed to execute a pedagogical strategy aimed at meeting the educational needs of the trainee as determined by the author's design and an assessment of the trainee's performance. A virtual mentor, like a live mentor, views data the trainee has uncovered and the trainee log of actions, and applies rule sets to reach inference, prediction and assessment conclusions.

During step 250, the virtual patient, its internal network of ontological classes, and the tools to discover information from those classes interact in a manner similar to our understanding of real life. The structure and function and their related properties are resident in the virtual patient similar to real life. The tools to discover that structure and function are designed to detect similar properties seen in real life. The actions employed by the user to effect change in the virtual patient are performed to change properties similar to that in real life. This design strategy produces a realistic simulation, and is consistent with a defined system of concepts and relationships within an ontology that represents our current understanding of anatomy and physiology in health and disease. In response to trainee queries the system returns information stored in the virtual patient that includes history, examination and laboratory results as well as textual and visual study reports that simulate input from consultants. In an illustrated embodiment, the system's responses to the trainee's queries are stored as data in a trainee copy of the virtual patient. At the beginning of the session, the copy is representative of a virtual human without abnormalities. The diagnosis process by the trainee results in a gradual modification of the trainee's copy of the virtual patient. In the case of successful diagnosis, the trainee's copy closely resembles the system's version of the virtual patient that was originally assigned to the trainee.

In some embodiments, the differences between the trainee copy and the system's version are quantified by a virtual mentor and serve as a score or a basis for a score of the trainee's performance.

At any point during the diagnosis of the virtual patient, the trainee may proceed with treatment. In other words, the system allows the trainee not only to issue queries but also to intervene in the simulation, changing property values of objects within the virtual patient. A manipulation of virtual patient data through trainee intervention produces functional or anatomical modifications to the virtual patient, or both. Functional effects include up-regulating, down-regulating, adding or removing a function, and changing the action of a mechanism or pathway, among others. Anatomical effects include changes in physical characteristics of size, shape, radiological and pathological properties, and presence or absence of a structure among others. These effects are manifest as alterations in image representations in some embodiments.

Changes in the status of the virtual patient are represented ontologically in terms of changes in property values in the given instance of the virtual patient. Any single change can induce other changes by triggering a related domain script. For example, if a gastric neoplasm grows to a certain size, then the script for nausea is triggered. The nausea script in this example has a time-sensitive development with side effects (e.g., a decrease of patient food intake and resulting loss of weight). The chaining of medical events and their effects is an advantage of modeling a patient biomechanistically, since a script for an event like nausea is much the same regardless of its triggering biomechanism. An important aspect of the virtual patient is its time-sensitive modeling.

In some embodiments, the trainee controls the time steps of the simulation (i.e., controls the "clock"), permitting virtual follow-up interviews, (re)issuing of lab tests, (re)ordering of a biopsy and the like at any given time. Controlling the clock is an advantage for the trainee because events like growth of a neoplasm and weight loss due to nausea are authored to develop at a certain rate. The simulation remains lifelike in that diagnostic procedures are carried out and results are obtained in a time frame appropriate for the corresponding real world procedures.

In an illustrated embodiment, processing in the simulation environment is carried out within the dynamic dependency-directed planning paradigm. In this paradigm, declarative data (e.g., the ontological knowledge about genes, proteins, cells, tissues, organs, organisms, virtual tools, virtual clinicians, etc.) is augmented with procedural attachments (e.g, scripts) that support automatic modification of data stored in instances of ontological concepts (e.g., virtual patients). These procedures are controlled by Hunter-Gatherer, a processing architecture integrating constraint satisfaction, branch-and-bound and solution synthesis algorithms. See Beale, Stephen, "Hunter-Gatherer: applying constraint satisfaction, branch-and-bound and solution synthesis to computational semantics," Ph.D. Dissertation, Language and Information Technologies Program, School of Computer Science, Carnegie Mellon University, 1997 (Beale 1997a) and Beale, Stephen. 1997b, "Using branch-and-bound with constraint satisfaction in optimization problems," Proceedings of AAAI-97, Providence, R.I., 1997 (Beale 1997b), the entire contents of both of which are hereby incorporated by reference as if fully set forth herein. Hunter-Gatherer has been demonstrated to reduce the complexity of computation in a variety of problems, including such well-known tasks as graph coloring and the transportation problem. It works especially well when the task is decomposable into subtasks with relatively few interactions among them. In the illustrated embodiment, the interactions are concentrated in the area of interest (e.g., the gastrointestinal organ system) and interactions with other organ systems are much less intensive than interactions within the same system. In such embodiments, Hunter-Gatherer provides efficient control of the process.

Figure 3B:
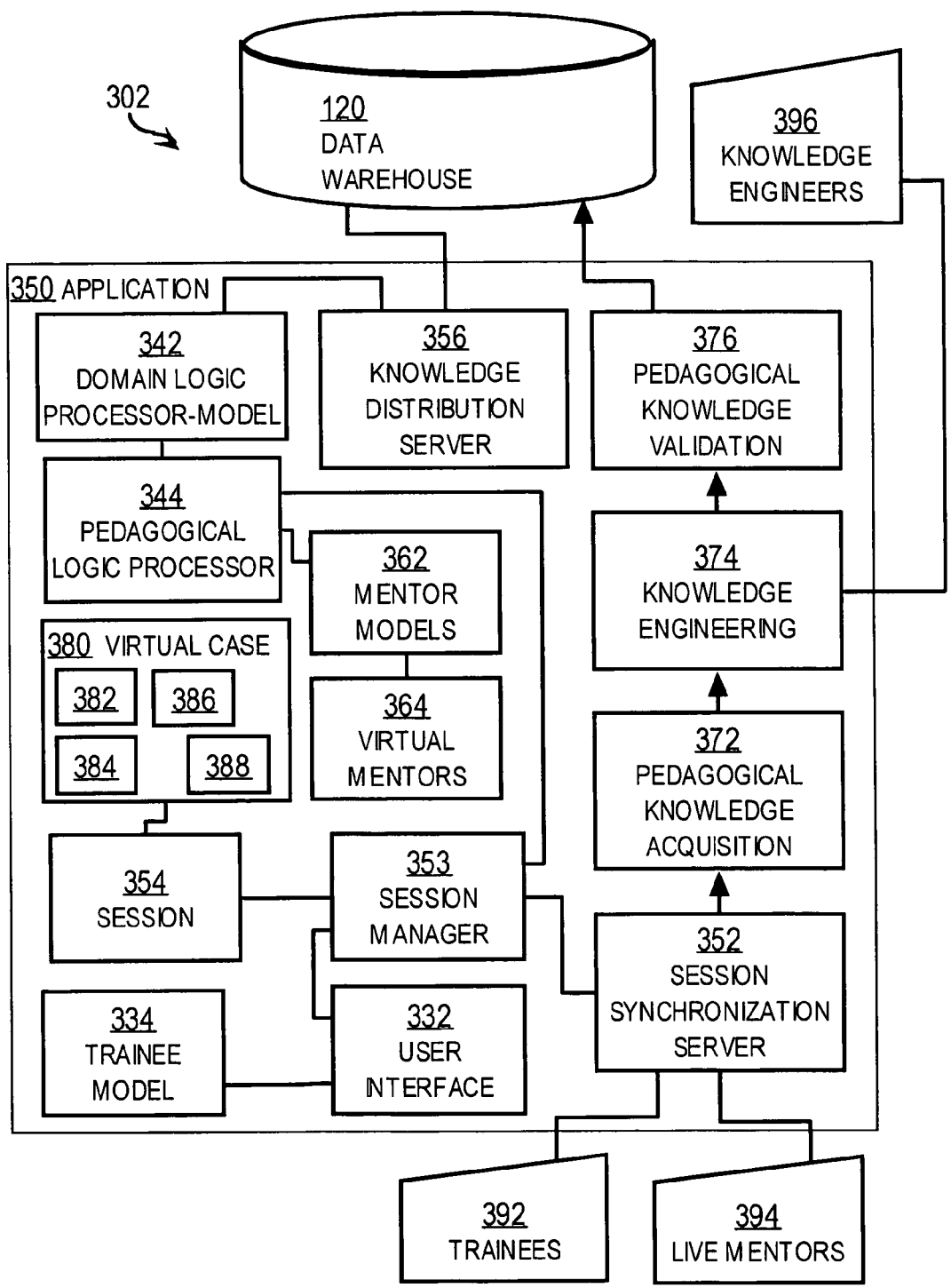
FIG. 3B is a block diagram that illustrates a system with more detailed components of the application, according to an embodiment.

FIG. 3B is a block diagram that illustrates a system 302 with more detailed components of the application, according to an embodiment described next. System 302 includes data warehouse 120 as described above for system 301. System 302 allows for inputs from multiple trainees and live mentors and also allows for input from knowledge engineers on input devices 392, 394, 396, respectively. Although shown as separate input devices for purposes of illustration, in other embodiments one or more trainees, mentors and knowledge engineers share one or more input devices 392, 294, 396.

System 302 includes an application 350 that is an example embodiment of application 150. Application 350 includes a session synchronization server 352, session manager process 353, and session object 354. Application 350 also includes user interface process 332 and trainee model object 334. Application 350 also includes a knowledge distribution server 356, a domain logic processor and model 342, a pedagogical logic processor 344, mentor models 362, and virtual mentors 364 (including virtual mentor 152 depicted in FIG. 1). Application 350 includes a pedagogical knowledge acquisition process 372, a knowledge engineering process 374 and a pedagogical knowledge validation process 378. Application 350 also includes virtual case 380 that involves a single trainee's interactions with a single virtual patient. Any of the objects or processes depicted in application 350 may be performed on any node of a network; it is anticipated that the architecture depicted in FIG. 3B is web enabled in some embodiments.

Session synchronization server 352 is a process that handles multiple simultaneous and delayed interactions with human trainees and mentors through input devices 392, 394. As each trainee signs on to system 302 at terminal 392, the session synchronization server 352 determines whether and which live mentor at terminal 394 is to be associated with the trainee. A session manager process 353 is started to deal with inputs from a particular trainee and zero or more particular associated mentors. Any method known in the art may be used as session synchronization server 352.

The session manager process 353 forms an instance of a session object 354 to store data indicating the results of the session involving the particular trainee and associated mentors. The session object provides links and exchanges data with other objects associated with a virtual case 380, which is described in more detail below.

The user interface process 332 exchanges data with a trainee or live mentor on devices 392, 394 through session manager 353 and session synchronization server 352. The user interface 332 presents interactive elements, such as icons, buttons, data input forms, and other interactive elements well known in the art to exchange data with a human user. In the example embodiments, the user interface 332 allows the trainee to select a virtual case 380 and to request actions for the virtual case 380, to see feedback from a virtual or live mentor, and to present results from the requested actions. The user interface 332 also allows an associated live mentor to select a virtual case 380, to present status of the virtual case 380, to view a log of trainee actions stored by the virtual case 380, to send messages to the particular trainee, and to assess the performance of the trainee. The live mentor is included as both a fail-safe mechanism and as a way to discover additional mentoring that can be transitioned into the virtual mentor. In some example production embodiments, a synchronous live mentor is not present. In some embodiments the human mentor steps are implemented as asynchronous interactions.

The options presented to the trainee on device 392 depends on a trainee model object 334 associated with the particular trainee. The trainee model object 334 includes data and functions to generate and respond to the trainee through user interface 332. In some embodiments, a workflow script portion of the trainee model is empty at the beginning of a mentoring session. In other embodiments the system moves a portion of the domain model, such as a virtual normal human, into the trainee model to reflect the system's perception of the trainee's general knowledge and beliefs about the subject matter (i.e., a trainee's "mental model" of the subject matter). The trainee model provides a stepping stone to analysis of basic ontological misconceptions that the trainee may have and to the eventual correction of those misconceptions. While operating the system, the trainee builds up these portions of the trainee model, in the form of a workflow script consisting of the component events that the trainee chose during the session, as modified by the mentoring guidance or intervention, or both. It is by comparing this nascent workflow script with the relevant workflow scripts in the mentor model that the system assesses the trainee's progress and provides the necessary mentoring. For example, the trainee's view of the virtual patient, stored in trainee model 334 is compared to the actual virtual patient in the virtual case 380 to assess the trainee's current diagnosis and hence the trainee's performance.

A knowledge distribution server 354 stores and retrieves data on the data warehouse, such as the medical knowledge base 122, mentoring knowledge base 128, normal human data 124, and abnormalities data, and virtual patient data. In example embodiments, the knowledge base includes medical domain and clinical application knowledge.

A domain model is sometimes called an expert model because it represents the material to be studied as encoded by the subject matter experts. The domain can be broad (e.g., all medical practice) or narrow (gastrointestinal systems). The trainee model reflects the trainee's view of the same subject matter and is supposed to get progressively closer to the expert model as learning progresses. The mentor model contains pedagogical knowledge, including knowledge of mentor-student interaction. Each of the models can contain different types of knowledge, including three types—declarative (what), procedural (how) and conceptual (why). The three types of knowledge are best captured using different classes of knowledge representation schemata—roughly, semantic networks, production systems and mental models, respectively.

A domain logic processor and model 342 includes a domain model and a domain logic processor. A domain model describes and contains the medical and relevant non-medical knowledge, including relationships between knowledge as well as scripts defining conditional or non-conditional actions in which the knowledge partakes. The domain logic processor determines the type of case under examination by the particular trainee and, based on the domain model, extracts from the data warehouse 120, through server 356, the appropriate information from the mentoring knowledge base and medical knowledge base. In the example embodiments, the domain model includes domain and workflow scripts. The domain scripts cover, for example, the sequence of events connected with the progression of a disease, with different tracks for the cases when the disease is treated or left untreated. Workflow scripts encode clinical knowledge—the mentors' knowledge about the appropriate diagnostic and treatment procedures. These workflow scripts reflect differences of opinion among experts as well as alternative diagnostic strategies and action sequences. MeSH Topical Subheading Hierarchies provide the top levels of the medical subtrees in an example domain. The MeSH qualifiers influence ontological class characteristics (relations and attributes) that are used in the medical domain.

The pedagogical logic processor 344 determines and implements the pedagogical approaches for guiding trainee inputs as received from the domain logic processor. In various embodiments, the pedagogical approaches include one or more of (1) leaving the trainee request unmodified for self-discovery; (2) allowing the virtual mentor to modify the trainee request; (3) allowing the virtual mentor to inject addition requests; and (4) allowing the virtual mentor to terminate the trainee's request.

Mentor models 362 are ontological classes that implement one or more of the pedagogical approaches based on user input and trainee history. Virtual mentors 364 (including virtual mentor 152 depicted in FIG. 1) are objects that are instances of the mentor model ontological classes.

The pedagogical knowledge acquisition process 372, reviews inputs of live mentors on input device 392 for a current state of the virtual case 380 and determines whether the input follows a protocol already captured in the mentoring knowledge base. If not, the live mentor input and current state of virtual case 380 are forwarded to the knowledge engineering process 374, where they are examined by knowledge engineers operating on I/O device 396. Based on input from knowledge engineers through I/O device 396, a new rule or protocol is determined for responding to trainee requests. The new rule is passed to the pedagogical knowledge validation process 378, which validates the rule. If the rule is validated, then it is added to the mentoring knowledge base 128 in data warehouse 120.

Virtual case 380 includes virtual patient data 382, virtual tools 384, virtual clinicians 386 and session log 388. The virtual patient 382 is an instance of organism data 310 for a human with at least one abnormality among the ontological objects 316. In some embodiments, patient 382 is retrieved from the data warehouse 120 through server 356. The virtual tools 384 and virtual clinicians 386 are instances of the ontological classes described above. For example, if the trainee has ordered X-rays, then a virtual tool for X-rays and a virtual radiologist are instantiated as 384, 386, respectively.

The session log 388 records trainee actions, virtual mentor messages if any, live mentor input, if any, and system responses for the particular trainee operating on a particular virtual patient 382. In some embodiments, the session log 388 is stored on data warehouse 120 through server 356.

During steps 240 and 250, one or more of the processes and objects in application 350 are employed. The following describes an example embodiment, after the authoring steps described above.

When the trainee signs on to the system 302 through I/O device 392, the session manager 353 uses the user interface 332 to query the trainee for information that identifies the trainee (a trainee ID). The trainee ID is sent to the pedagogical logic processor 344. The processor 344 sends the trainee ID to the domain logic processor and model 342 which determines an existing virtual case associated with the trainee ID, such as in a previous session by a live mentor. The data for the virtual case 380 is retrieved, for example, from an internal store or from the data warehouse 120. The retrieved virtual case 380 includes the virtual patient 382 and any session logs 388 already accumulated for the case 380. The virtual case 380 is sent to the session manager 352 which instantiates a session object 354 to mange the virtual case 380 during the current session with the particular trainee.

The domain logic processor and model 342 determines the medical knowledge relevant for this virtual patient 382, e.g., gastrointestinal systems medical knowledge for use by one or more virtual mentors. In the example embodiments the domain logic processor and model 342 also determines the pedagogical approach to use with the particular trainee and case. The system loads the ontological classes for mentor models 362 that implement the determined pedagogical approach from the mentoring knowledge base 128 in data warehouse 120 and replicates that approach for several medical areas (e.g., pulmonary and gastrointestinal) for several mentor models. The mentoring knowledge base 128 includes any mentoring protocols validated during previous sessions. One or more virtual mentors 364 are later instantiated from the mentor models 362 as needed to respond to user requests.

In step 240 a trainee requests an action, whether investigative or interventional, using one or more virtual tools accessible through user interface 332 presented on I/O device 392 by session manager 353 through server 352.

During step 252, the session manager 353 sends the request to the pedagogical logic processor to determine whether to allow or modify the requested action. The processor 344 makes the determination by instantiating one of the mentor models 362 as a virtual mentor 364 and sending the request to the virtual mentor 364. The virtual mentor 364 sends a response to the processor 344. In some embodiments, during step 254, the pedagogical processor 344 sends the request and virtual mentor response through session manager 353 to the live mentor at I/O device 394, if any, using the user interface 332. If the live mentor provides a response, the response is sent to session manager 353. The session manager 353 then forwards the trainee request and either the virtual mentor response or the live mentor response, or both, to the session object 354. The session object stores the request and mentor responses in the log 388. The live mentor response, if any, is also forwarded by the session synchronization server 352 to the pedagogical knowledge acquisition process 372 for processing as described above.

The session object 354 includes functions that create an instance of a virtual tool 384 and virtual clinician 386 to implement the trainee request, as modified by the live or virtual mentors. The virtual clinician 386 retrieves data from the virtual patient 382. If directed by the request, the virtual clinician 386 changes the virtual patient 382, e.g., by deleting an abnormal object that is surgically removed. The virtual clinician 386 then forms a response which is sent to the session object 354, which records the response in the log 388.

In step 280 the response is sent to the trainee at I/O device 392 by the session object 354 through the session manager 353 and session synchronization server 352.

In step 258, the session object 354 updates the virtual patient 382, e.g., by advancing one or more normal or abnormal objects in time and recalculating the data values for the parameters of the objects included in the patient 382. In some embodiments, the session object 354 sends another response message based on the recalculated virtual patient, e.g., a status report on the patient at the next elapsed time. The message is recorded in the log 388.

During step 280, the message, e.g., the status report, is sent by the session object 354 to the trainee at I/O device 392. During step 290 the message, e.g., the status report, is sent to the live mentor at I/O device 394, if any.

During step 250 the message, e.g., the status report, is sent to the virtual mentor 364. In an example embodiment, the live mentor at device 294 sends a live feedback message to the virtual mentor 364 during step 254. Based on the message to the virtual mentor 364 and the pedagogical processor and the live mentor, if any, the virtual mentor 364 sends a mentor feedback message to the session manager 353. The session manager 353 forwards the mentor feedback message to the session object 354, which records the mentor feedback message in log 388.

During step 280, the session manager 353 forwards the mentor feedback message to the trainee at I/O device 392.

The example embodiments provide multiple advantages over prior art approaches. In the example embodiments, the patient data sets are rich in detail and knowledge, and evolve as new ontological classes are added. The patient data sets are standardized and in National Library of Medicine (NLM) format. Actual data from a patient with the disease of interest can be inserted into an instance of a virtual patient, making the simulation even more realistic. The ontological classes and objects, polymesh data and image data based on the actual disease data can be used to create an NLM databank of standardized diseased patient data in a sharable form for other applications, just as image databanks are available today. The Joint Photographic Experts Group (JPEG) and the picture archiving and communications system (PACS) formats for imagery data are fairly standard and thus are readily shared. The human data formats provide a natural connection to other cognitive simulators that are later developed as certain part-task simulators. As automated image interpretation evolves (e.g., for CT scans), a real image can be imported, used to generate polymeshes and links to ontological objects, and presented for interpretation by the trainee, without involvement by a human author. This will make an additional component of the system 301 automatic. The ontological classes, polymesh data and image data used herein can serve as a de facto standard for the "patient sharable object" for the medical care industry.

4. Computer System Overview

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 478 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 402 for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves. The term computer-readable storage medium is used herein to refer to any computer-readable medium except transmission media.

Common forms of computer-readable media include, for example, a floppy disk, a flexible disk, a hard disk, a magnetic tape, or any other magnetic medium, a compact disk ROM (CAROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 478 typically provides information communication through one or more networks to other devices that use or process the information. For example, network link 478 may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides information representing video data for presentation at display 414.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 478 and other networks through communications interface 470, which carry information to and from computer system 400, are exemplary forms of carrier waves. Computer system 400 can send and receive information, including program code, through the networks 480, 490 among others, through network link 478 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other nonvolatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 478. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for delivering medical care by improving decision-making skills of medical personnel who deliver the care, comprising the steps of:

receiving by one or more processors normal data that indicates normal conditions in a patient, wherein the normal data includes data that indicates properties of an internal anatomical unit, a polymesh of coordinates associated with the anatomical unit and a mapping of the polymesh to a region of imagery data from a visible human data base, and associates the polymesh with the properties of the anatomical unit which include values for at least anatomical relationship, electromagnetic imaging characteristics, metabolic function, response to perturbations, and evolution with time;

receiving by the one or more processors from an author abnormality data that indicates an abnormal condition in an patient, wherein the abnormality data indicates deviations from normal data;

generating by the one or more processors an instance of a virtual patient based on the normal data and the abnormality data, wherein the instance of the virtual patient describes a sufficiently comprehensive physical state of a patient having the abnormal condition to simulate clinical measurements of the patient's condition including normal and abnormal properties of the anatomical unit;

receiving by the one or more processors from a trainee who is different from the author action data that indicates a requested action relevant to dealing with the instance of the virtual patient;

generating by the one or more processors response data based on the action data and the instance of the virtual patient; and initiating presenting by the one or more processors to the trainee display data based on the response data, wherein the display data indicates information about the instance of the virtual patient available to a medical professional as a result of the requested action.

2. The method as recited in claim 1, wherein:

said step of generating response data further comprises the step of generating response data that includes mentor response data that indicates expert advice from a mentor based on the action data and the instance of the virtual patient and a model of a virtual mentor; and said display data includes the mentor response data.

3. The method as recited in claim 2, said step of generating the response data further comprising determining the mentor response data based on a knowledge base rule and a pedagogical rule.

4. The method as recited in claim 3, said step of determining the mentor response data based on the pedagogical rule further comprising determining the mentor response data based on at least one pedagogical rule of a set of pedagogical rules including:

a null response rule wherein the mentor response data is empty, whereby the trainee is taught through self-discovery;

a guided response rule wherein the trainee is directed to consider at least one of a deficiency in the requested action, an alternative action, a topic in a knowledge base, and a plurality of search elements to use in a search engine; and an intervention rule wherein the requested action is modified or prevented.

5. The method as recited in claim 2, wherein:

the method further comprises receiving by the one or more processors live input from a human medical mentor; and said step of generating response data that includes mentor response data further comprises the steps of:

generating mentor response data that includes live data based on the live input; and updating said model of a virtual mentor based on the live input.

6. The method as recited in claim 1, said step of receiving action data further comprising the step of receiving action data that indicates at least one of, asking a question of the instance of the virtual patient;

requesting file data about the instance of the virtual patient;

requesting a diagnostic test be performed on the instance of the virtual patient;

requesting an imaging procedure be performed on the instance of the virtual patient;

requesting a surgical procedure be performed on the virtual patient; and prescribing a treatment for the instance of the virtual patient.

7. The method as recited in claim 1, said step of generating response data further comprising the step of retrieving image data associated with the instance of the virtual patient.

8. The method as recited in claim 1, said step of generating response data further comprising the step of deriving diagnostic test results associated with the instance of the virtual patient.

9. The method as recited in claim 1, said step of generating response data further comprising the step of updating the instance of the virtual patient.

10. The method as recited in claim 9, said step of updating the instance of the virtual patient further comprising performing at least one of the steps of:

determining a physical state of a patient having the abnormality after an advancement in time;

determining the physical state of the patient having the abnormality after the advancement in time with a treatment indicated in the action data; and determining the physical state of the patient having the abnormality after a surgical procedure indicated in the action data is performed.

11. The method as recited in claim 1, wherein:

the method further comprises receiving by the one or more processors live input from a human medical mentor; and said step of generating response data further comprises the step of generating response data that includes mentor response data based at least in part on the live input.

12. The method as recited in claim 1, wherein:

said step of generating response data further comprises the step of generating trainee assessment data that indicates performance of the trainee; and the method further comprises initiating by the one or more processors presenting trainee assessment data.

13. The method as recited in claim 1, said step of receiving normal data further comprises selecting normal data based on at least one of gender, age, race, and environment.

14. The method as recited in claim 1, said step of receiving normal data further comprising the step of receiving anatomical class data that describes an anatomical class of one or more clinically relevant anatomical structures, said anatomical class data including:

physical property data for the anatomical class; and instructions for functions to retrieve information from the anatomical class.

15. The method as recited in claim 14, said step of receiving abnormality data further comprising the step of receiving abnormal property data that describes a deviation from the physical property data for an anatomical class.

16. A method for delivering medical care by improving decision-making skills of medical personnel who deliver the care, comprising the steps of:

receiving by one or more processors data indicating a set of pedagogical rules for a virtual mentor including:

a null response rule wherein mentor response data is empty, whereby a trainee is taught through self-discovery;

a guided response rule wherein the trainee is directed to consider before executing the requested action at least one of a deficiency in a requested action requested by the trainee, an alternative action, and a topic in a knowledge base; and an intervention rule wherein the requested action is modified or prevented;

receiving by the one or more processors from the trainee action data that indicates the requested action relevant to dealing with a patient having an abnormal condition;

determining by the one or more processors the mentor response data that indicates expert advice from the virtual mentor based on the action data, data describing the patient having the abnormal condition, a knowledge base rule, and at least one pedagogical rule of the set of pedagogical rules; and initiating by the one or more processors presenting to the trainee display data attributed to the virtual mentor based on the mentor response data.

17. A non-transitory computer-readable medium carrying one or more sequences of instructions for delivering medical care by improving decision-making skills of medical personnel who deliver the care, wherein execution of the one or more sequences of instructions by one or more processors causes the one or more processors to perform the steps of:

receiving normal data that indicates normal conditions in a patient, wherein the normal data includes data that indicates properties of an internal anatomical unit, a polymesh of coordinates associated with the anatomical unit and a mapping of the polymesh to a region of imagery data from a visible human data base, and associates the polymesh with the properties of the anatomical unit which include values for at least anatomical relationship, electromagnetic imaging characteristics, metabolic function, response to perturbations, and evolution with time;

receiving from an author abnormality data that indicates an abnormal condition in an patient, wherein the abnormality data indicates deviations from normal data;

generating an instance of a virtual patient based on the normal data and the abnormality data, wherein the instance of the virtual patient describes a substantively comprehensive physical state of a patient having the abnormal condition including normal and abnormal properties of the anatomical unit;

receiving from a trainee action data that indicates a requested action relevant to dealing with the instance of the virtual patient;

generating response data based on the action data and the instance of the virtual patient; and presenting to the trainee display data based on the response data, wherein the display data indicates information about the instance of the virtual patient available to a medical professional as a result of the requested action.

18. A non-transitory computer-readable medium carrying one or more sequences of instructions for delivering medical care by improving decision-making skills of medical personnel who deliver the care, wherein execution of the one or more sequences of instructions by one or more processors causes the one or more processors to perform the steps of:

receiving data indicating a set of pedagogical rules for a virtual mentor including:
  a null response rule wherein mentor response data is empty, whereby a trainee is taught through self-discovery;
  a guided response rule wherein the trainee is directed to consider before executing the requested action at least one of a deficiency in a requested action requested by the trainee, an alternative action, and a topic in a knowledge base; and
  an intervention rule wherein the requested action is modified or prevented;

receiving from the trainee action data that indicates the requested action relevant to dealing with a patient having an abnormal condition;

determining the mentor response data that indicates expert advice from the virtual mentor based on the action data, data describing the patient having the abnormal condition, a knowledge base rule, and at least one pedagogical rule of the set of pedagogical rules; and presenting to the trainee display data attributed to the virtual mentor based on the mentor response data.

19. A system for delivering medical care by improving decision-making skills of medical personnel who deliver the care comprising:

a computer-readable medium holding normal data that indicates normal conditions in a patient, wherein the normal data includes data that indicates properties of an internal anatomical unit, a polymesh of coordinates associated with the anatomical unit and a mapping of the polymesh to a region of imagery data from a visible human data base, and associates the polymesh with the properties of the anatomical unit which include values for at least anatomical relationship, electromagnetic imaging characteristics, metabolic function, response to perturbations, and evolution with time;

means for receiving from an author abnormality data that indicates an abnormal condition in an patient, wherein the abnormality data indicates deviations from normal data;

means for generating an instance of a virtual patient based on the normal data and the abnormality data, wherein the instance of the virtual patient describes a substantively comprehensive physical state of a patient having the abnormal condition including normal and abnormal properties of the anatomical unit;

means for receiving from a trainee action data that indicates a requested action relevant to dealing with the instance of the virtual patient;

means for generating response data based on the action data and the instance of the virtual patient; and a display for presenting to the trainee display data based on the response data, wherein the display data indicates information about the instance of the virtual patient available to a medical professional as a result of the requested action.

20. A system for delivering medical care by improving decision-making skills of medical personnel who deliver the care, comprising:

means for receiving data indicating a set of pedagogical rules for a virtual mentor including:
  a null response rule wherein mentor response data is empty, whereby a trainee is taught through self-discovery;
  a guided response rule wherein the trainee is directed to consider before executing the requested action at least one of a deficiency in a requested action requested by the trainee, an alternative action, and a topic in a knowledge base; and
  an intervention rule wherein the requested action is modified or prevented;

means for receiving from the trainee action data that indicates the requested action relevant to dealing with a patient having an abnormal condition;

means for determining the mentor response data that indicates expert advice from the virtual mentor based on the action data, data describing the patient having the abnormal condition, a knowledge base rule, and at least one pedagogical rule of the set of pedagogical rules; and means for presenting to the trainee display data attributed to the virtual mentor based on the mentor response data.

* * * * *